(12) United States Patent
Cassina

(10) Patent No.: US 8,336,854 B2
(45) Date of Patent: Dec. 25, 2012

(54) VALVE FOR LIQUID CONTAINERS

(75) Inventor: Virginio Cassina, Gorle (IT)

(73) Assignee: Greif International Holding B.V., Vreeland (NL)

( * ) Notice: Subject to any disclaimer, the term of this patent is extended or adjusted under 35 U.S.C. 154(b) by 657 days.

(21) Appl. No.: 12/359,638

(22) Filed: Jan. 26, 2009

(65) Prior Publication Data

US 2009/0200506 A1 Aug. 13, 2009

(30) Foreign Application Priority Data

Feb. 8, 2008 (EP) .................................... 08398002

(51) Int. Cl.
*F16K 25/00* (2006.01)
(52) U.S. Cl. ...................................................... 251/368
(58) Field of Classification Search .................... 251/368
See application file for complete search history.

(56) References Cited

U.S. PATENT DOCUMENTS

| | | | | |
|---|---|---|---|---|
| 3,026,899 | A | * | 3/1962 | Mischanski ................ 137/375 |
| 3,747,479 | A | * | 7/1973 | Nightingale et al. ........ 92/203 |
| 4,139,590 | A | | 2/1979 | Rubright |
| 4,191,205 | A | * | 3/1980 | Nash ........................... 137/375 |
| 4,890,640 | A | * | 1/1990 | King, Sr. .................... 137/512.4 |
| 5,505,428 | A | * | 4/1996 | De Moss et al. ........... 251/149.9 |
| 7,143,996 | B2 | * | 12/2006 | Kohlen et al. ............... 251/305 |
| 2002/0033465 | A1 | * | 3/2002 | Mori et al. ................... 251/368 |

FOREIGN PATENT DOCUMENTS

GB 2011586 7/1979

OTHER PUBLICATIONS

European Search Report dated Jul. 23, 2008 for EP Application No. 08398002.9.

* cited by examiner

*Primary Examiner* — John K Fristoe, Jr.
*Assistant Examiner* — Ian Paquette
(74) *Attorney, Agent, or Firm* — Kyle M. Zeller; King & Spalding

(57) ABSTRACT

The present invention relates to a valve for liquid containers, which comprises a conduit for liquid passage having an inlet and an outlet, a closing member disposed in the conduit, which is movable between an open position and a closed position, and an actuator for driving the closing member. The conduit is made of a first chemically resistant thermoplastic material and the closing member is made of a second thermoplastic or thermosetting material. Particularly, all the surface of the closing member that faces the inlet in the closed position, is coated with a third thermoplastic material which is heat-sealed to said second material and has high chemical resistance.

12 Claims, 2 Drawing Sheets

VALVE FOR LIQUID CONTAINERS

This application claims priority under 35 U.S.C. §119(a) to European Patent Application No. 08398002.9, filed Feb. 8, 2008, the contents of which are hereby incorporated by reference in their entirety.

FIELD OF THE INVENTION

The present invention relates to a valve for liquid containers.

BACKGROUND OF THE INVENTION

Plastic valves for liquid containers are known and used, for example, in the chemical, petrochemical, pharmaceutical, food industries and the like.

Certain liquids contained in containers can be highly corrosive, whereas others can have a milder corrosive effect. In use, the inner parts of valves are exposed to contact with the product in the container, even for long periods of time. As used herein, the term "inner parts" of a valve is meant to indicate the inner walls of the conduit for passage of the product, the closing member which shuts off product passage to prevent outflow, and the gasket thereof.

In addition to chemical aggressions, the liquid contained in containers also applies physical pressure to the inner parts of the valve, e.g. caused by the product weight or mechanical expansion or contraction stresses due to temperature changes or reactions within the product. This action is particularly problematic for the closing member which is the only movable part and is more exposed to such stresses, due to its construction. Therefore, a valve closing member shall ensure optimal performances both in terms of mechanical properties and chemical resistance with time.

Hence, it would be desirable to have valves that can provide optimal mechanical and chemical performance with time, while being of easy, quick and cost-effective fabrication.

Therefore, an object of the present invention is to provide valves that can combine excellent performances with an equally practical and cost-effective fabrication.

SUMMARY OF THE INVENTION

The foregoing object and others are achieved by a valve for liquid containers comprising a conduit for liquid passage having an inlet and an outlet, said conduit being made of a first thermoplastic material, a closing member disposed in the conduit, which is movable between an open position and a closed position to allow and prevent liquid passage from the inlet to the outlet respectively, said closing member having a surface facing towards said inlet in said closed position, said closing member being made of a second thermoplastic or thermosetting material, and an actuator for driving said closing member between the open position and the closed position, all the surface of the closing member is coated with a third thermoplastic material which is heat-sealed to the first material and has high chemical resistance. Further advantages and preferred embodiments of the invention are as set out in the dependent claims.

Further features and advantages of the invention will be apparent from the following detailed description, which is made with reference to exemplary, non exclusive embodiments thereof, and to the accompanying figures, wherein:

DETAILED DESCRIPTION

Figure 1:
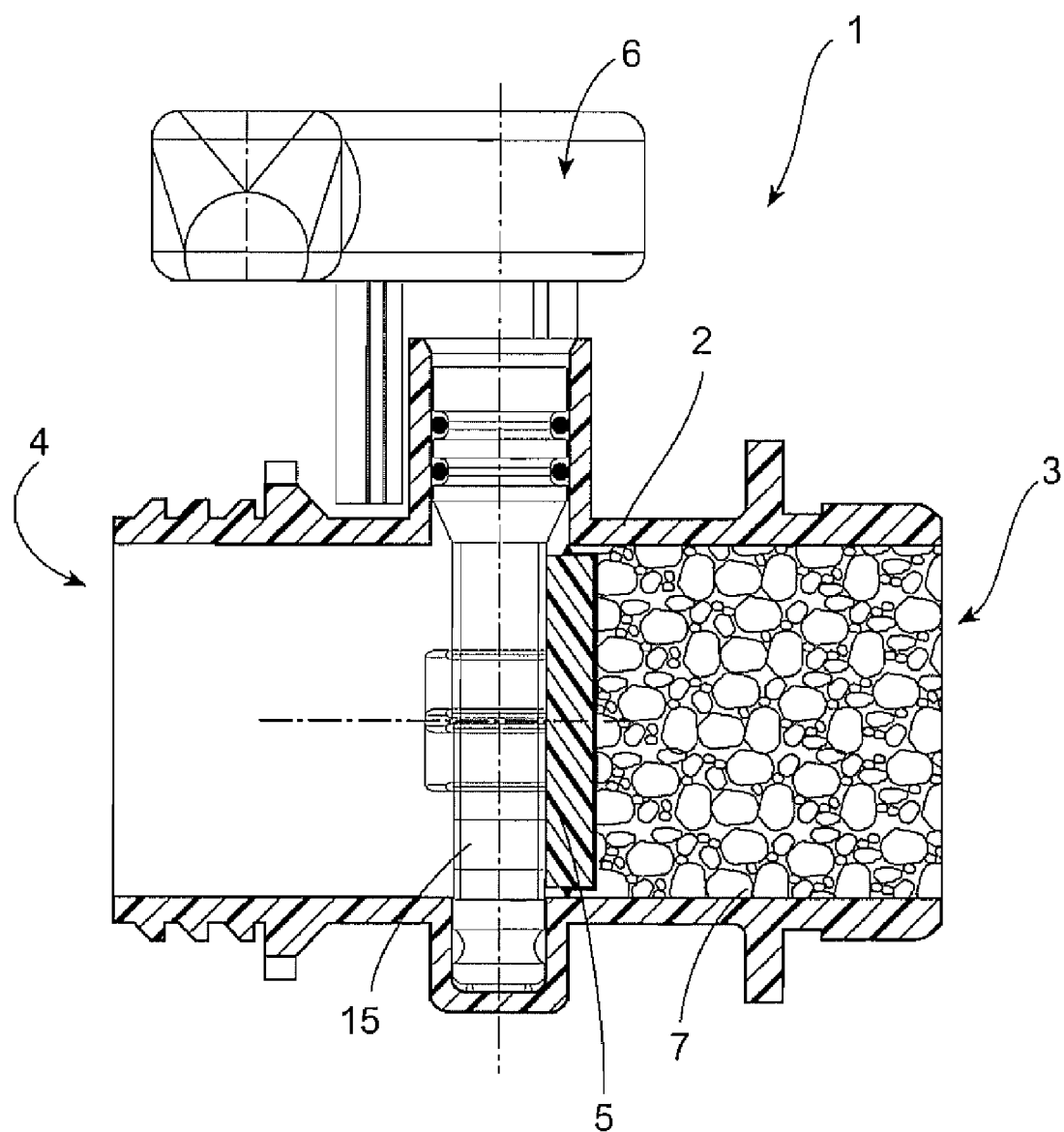
FIG. 1 is a cross sectional view of a valve according to one embodiment of the present invention.

Referring to the annexed figures, numeral 1 denotes a valve for liquid containers according to the present invention.

Particularly, the valve 1 is adapted to be connected to the discharge connection or the discharge port of a container for transport and storage of liquids.

The valve 1 comprises a conduit 2 for liquid passage having an inlet 3 and an outlet 4.

This conduit 2 is formed from a chemically resistant thermoplastic material. Preferably, this material is selected from the group consisting of polystyrene (PS), polyethylene (PE), polypropylene (PP), fluorinated polymers such as polytetrafluoroethylene (PTFE), polyhexafluoropropene (PHFP), polyperfluoropropyl vinyl ether (PPFPVE), polyperfluoromethyl vinyl ether (PPFMVE), polychlorotrifluoroethylene (PCTFE) and polyvinylidene fluoride (PVDF) as such or reinforced, preferably with glass fibers or mineral fillers, and mixtures thereof. More preferably, said material is polypropylene or high density polyethylene (HDPE), which have adequate mechanical strength, possibly increased by the presence of glass fibers.

The valve 1 further comprises a closing member 5 disposed within the conduit 2, which is movable between an open position and a closed position to allow and prevent liquid passage from the inlet 3 to the outlet 4 respectively, and an actuator 6 for driving the closing member 5 between the open position to the closed position. Particularly, in the closed position, the closing member 5 has a surface 5a facing towards the inlet 3.

In accordance with the embodiment as shown herein, the valve 1 further comprises a support member 15 connected to the actuator 6 and adapted to support the closing member 5.

In the example as shown herein, the valve 1 is a butterfly valve, therefore the closing member 5 is a butterfly valve member. Nonetheless, the valve 1 might be a ball valve, a flap valve, a gate valve and the like.

The valve 1 finally comprises sealing means 8 disposed in the conduit 2, which are designed to improve tightness of the closing member 5 when such closing member 5 is in the closed position. These sealing means are made of a chemically resistant material.

In the example as shown in the accompanying figures, the sealing ring 8 is fitted in a circumferential groove formed in the closing member 5. In the case of ball valves, the sealing means 8 are seated in the conduit 2.

The figures further show, for clarity and illustration purposes only, a product 7 flowing to the valve 1 with the closing member 5 in the closed position. In this configuration, passage of the product 7 through the conduit 2 is prevented. It is apparent from the figures, particularly from FIG. 2, that in such closed position, the surface 5a of the closing member 5 faces towards the inlet 3 of the conduit 2 and therefore towards the product 7.

To prevent contact between the surface 5a of the closing member 5 and the product 7, all the surface 5a is coated with a layer of corrosion-resistant material.

The closing member 5 is made of a thermoplastic or thermosetting material. This affords cost-effective and quick fabrication. Preferably, this thermoplastic or thermosetting material has a high mechanical strength. This allows the closing member to adequately withstand all physical and mechanical stresses caused, for instance, by the product weight or positive expansion pressures or negative contraction pressures due to temperature changes or reactions within the product. Thermosetting materials suitable for the objects of the present invention include phenolic, urea, melamine, epoxy resins, possibly reinforced, and mixtures thereof Thermoplastic materials suitable for the objects of the present invention include polyvinyl chlorides, polyamides, polybutylene terephthalates, polyethylene terephthalate, ABS copolymers, polycarbonates, possibly reinforced, and mixtures thereof. Preferably, the closing member 5 is made of a thermoplastic or thermosetting material.

The layer of coating material is made of a thermoplastic material with high chemical resistance. This layer advantageously protects the closing member from any chemical aggression caused by contact with the product. Preferably, this coating material is selected from the group consisting of polystyrene (PS), polyethylene (PE), polypropylene (PP), olefinic thermoplastic elastomer (TEO), fluorinated polymers such as polytetrafluoroethylene (PTFE), ethylene tetrafluoroethylene (ETFE), polyhexafluoropropene (PHFP), THV terpolymer (whose three monomers are: TFE-HFP-VDF, i.e. tetrafluoroethylene, hexafluoroproene and vinylidene fluoride), polychlorotrifluoroethylene (PCTFE) and polyvinylidene fluoride (PVDF) as they are or reinforced, preferably with glass fibers or mineral fillers, such as talc, and mixtures thereof. These polymers have proved to be particularly suitable for the objects of the present invention because they exhibit high chemical inertness, and also allow for quick and cost-effective fabrication of the valve, as described in greater detail hereafter. More preferably, this second coating material is polyethylene, polypropylene or polytetrafluoroethylene (PTFE). These materials provide the additional advantage of improved heat-sealability to the closing member material.

This will provide a closing member that advantageously has excellent mechanical properties and also conveniently an excellent chemical inertness.

In another aspect, the present invention relates to a process for fabricating the above valve.

This process includes the steps of:
providing a conduit of thermoplastic material having an inlet and an outlet, a liquid shut-off member and an actuator for driving said closing member; and
assembling these components to form a valve;
wherein the closing member is obtained by heat-sealing a second thermoplastic or thermosetting material and a layer of a third thermoplastic material.

Preferably, said layer of thermoplastic material is heat-sealed to the previous layer by overinjection. By this arrangement, the coating of the closing member may be formed in conveniently shorter times and at very high costs.

Embodiments of the valve of the present invention and the process for its fabrication will now be described by way of example and without limitation.

EXAMPLES 1-10

Figure 2:
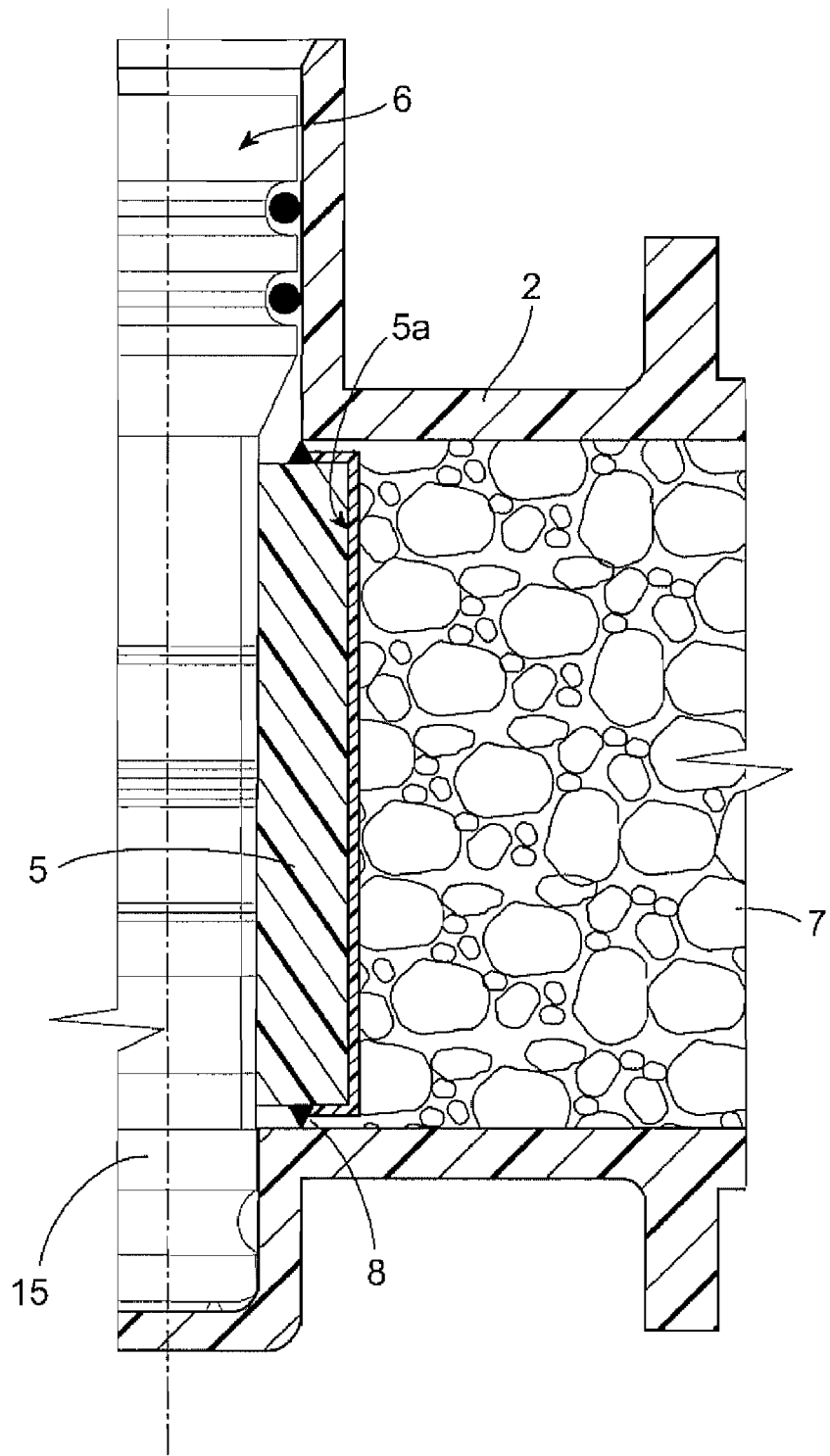
FIG. 2 is an enlarged view of the valve of FIG. 1.

In these examples, butterfly valves as shown in FIGS. 1 and 2 were assembled, which comprise closing members according to the present invention. Particularly, a thermoplastic coating material was overinjected onto the closing member made of a thermoplastic or thermosetting material, as set out in Table 1, over the surface area of the closing member only, which faces towards the inlet of the valve conduit in the closed position (see FIGS. 1 and 2). The materials used in these examples are listed in Table 1.

TABLE 1

| Example | Closing member material | Coating material |
|---|---|---|
| 1 | PBT | PE |
| 2 | PP, 30% glass fiber reinforced | Talc-filled high density PE |
| 3 | PET, 25% glass fiber reinforced | PP |
| 4 | PP, 25% glass fiber reinforced | ETFE |
| 5 | PA 6 | PCTFE |
| 6 | PA 6,6 | PTFE |
| 7 | Pa, 30% glass fiber reinforced | THV |
| 8 | PP, 30% glass fiber reinforced | TEO |

The temperatures for overinjection of the layer of second material were selected based on the properties of the material to be injected within processability ranges known in the art for each of them.

Conveniently, the closing member of the present invention and the valve including it were found to require very short fabrication times. Particularly, overinjection of the coating material was carried out in as little time as a few seconds, and this dramatically reduces valve assembly times.

Therefore, by appropriate selection of materials in combination with suitable processes, the valve of the present invention provides optimal mechanical and chemical performance with time, while being of easy, quick and cost-effective fabrication.

Namely, the particular structure of the closing member provides both high resistance to stresses caused by the product flowing to the valve, and high resistance to chemical aggression that might be generated by contact with the incoming product, especially when such contact takes place for long periods of time.

Those skilled in the art will obviously appreciate that a number of changes and variants may be made to the valve of the invention as described hereinbefore to meet specific needs, without departure from the scope of the invention, as defined in the following claims.

The invention claimed is:

1. A valve for liquid containers comprising:
a conduit for liquid passage having an inlet and an outlet, said conduit being made of a first thermoplastic material having chemical resistance,
a closing member disposed in the conduit, which is movable between an open position and a closed position to allow and prevent liquid passage from the inlet to the outlet respectively, said closing member being made of a second thermoplastic or thermosetting material having high mechanical strength, said second material being distinct from said first material, and
an actuator for driving said closing member between the open position and the closed position,
wherein
only all the surface of the closing member which, in said closed position, faces towards said inlet, is coated with a layer of third thermoplastic material which is heat-sealed to the second material and has high chemical resistance.

2. The valve according to claim 1, wherein said second thermosetting material is selected from phenolic, urea, melamine, epoxy resins, possibly reinforced, and mixtures thereof.

3. The valve according to claim 1, wherein said second thermoplastic material is selected from polyvinyl chlorides, polyamides, polybutylene terephthalates, polyethylene terephthalate, ABS copolymers, polycarbonates, possibly reinforced, and mixtures thereof.

4. The valve according to claim 1, wherein said first thermoplastic material is selected from the group consisting of polystyrene (PS), polyethylene (PE), polypropylene (PP), fluorinated polymers, as they are or reinforced, with glass fibers or mineral fillers, and mixtures thereof.

5. The valve according to claim 4, wherein said second thermosetting material is selected from phenolic, urea, melamine, epoxy resins, possibly reinforced, and mixtures thereof.

6. The valve according to claim 4, wherein said second thermoplastic material is selected from polyvinyl chlorides, polyamides, polybutylene terephthalates, polyethylene terephthalate, ABS copolymers, polycarbonates, possibly reinforced, and mixtures thereof.

7. The valve according to claim 1, wherein said third thermoplastic material is selected from the group consisting of polystyrene (PS), polyethylene (PE), polypropylene (PP), olefinic thermoplastic elastomer (TEO), fluorinated polymers such as polytetrafluoroethylene (PTFE), ethylene tetrafluoroethylene (ETFE), polyhexafluoropropene (PHFP), THV terpolymer, polychlorotrifluoroethylene (PCTFE) and polyvinylidene fluoride (PVDF) as they are or with fillers, and mixtures thereof.

8. The valve according to claim 7, wherein said third thermoplastic material is polyethylene, polypropylene or polytetrafluoroethylene (PTFE).

9. The valve according to claim 1, comprising sealing means disposed in said conduit, for improving tightness of the closing member when said closing member is in the closed position.

10. The valve according to claim 9, wherein said sealing means are made of a chemically resistant material.

11. A process for fabricating a valve for liquid containers according to claim 1, said process including the steps of:
  providing a conduit, made of a first thermoplastic material, having an inlet and an outlet, a closing member and an actuator for driving said closing member; and
  assembling said components to form a valve;
  wherein the closing member is obtained by heat-sealing a second thermoplastic or thermosetting material and a layer of a third thermoplastic material.

12. The process according to claim 11, wherein said layer of third thermoplastic material is heat-sealed to said second thermoplastic material by overinjection.

* * * * *